US 6,697,799 B1

(12) United States Patent
Neal et al.

(10) Patent No.: US 6,697,799 B1
(45) Date of Patent: Feb. 24, 2004

(54) AUTOMATED CLASSIFICATION OF ITEMS USING CASCADE SEARCHES

(75) Inventors: Michael Renn Neal, Superior, CO (US); James Michael Wilmsen, Westminster, CO (US); Christopher Wade Beall, Lafayette, CO (US)

(73) Assignee: Requisite Technology, Inc., Westminster, CO (US)

( * ) Notice: Subject to any disclaimer, the term of this patent is extended or adjusted under 35 U.S.C. 154(b) by 0 days.

(21) Appl. No.: 10/279,658

(22) Filed: Oct. 24, 2002

Related U.S. Application Data

(60) Continuation-in-part of application No. 10/086,329, filed on Feb. 27, 2002, and a continuation-in-part of application No. 09/900,733, filed on Jul. 5, 2001, which is a division of application No. 09/393,994, filed on Sep. 10, 1999, now Pat. No. 6,324,534.

(51) Int. Cl.[7] ............................................. G06F 17/30
(52) U.S. Cl. ............................ 707/3; 707/10; 706/12; 706/45; 709/218
(58) Field of Search .................. 707/1, 2, 3, 4, 707/10, 100, 102, 103 R; 705/26; 706/12, 45; 709/218, 224, 245

(56) References Cited

U.S. PATENT DOCUMENTS

| | | | | |
|---|---|---|---|---|
| 4,468,728 A | * | 8/1984 | Wang .............................. | 707/1 |
| 5,428,735 A | * | 6/1995 | Kahl et al. ....................... | 707/4 |
| 5,511,186 A | * | 4/1996 | Carhart et al. .................. | 707/2 |
| 5,630,125 A | * | 5/1997 | Zellweger ................. | 707/103 R |
| 5,706,497 A | * | 1/1998 | Takahashi et al. .............. | 707/5 |
| 5,715,444 A | * | 2/1998 | Danish et al. .................. | 707/4 |
| 5,781,772 A | * | 7/1998 | Wilkinson et al. .............. | 707/3 |
| 5,806,061 A | * | 9/1998 | Chaudhuri et al. ............. | 707/3 |
| 5,819,251 A | * | 10/1998 | Kremer et al. .................. | 707/1 |
| 5,832,526 A | * | 11/1998 | Schuyler ..................... | 707/205 |
| 5,903,890 A | * | 5/1999 | Shoji et al. ..................... | 707/3 |
| 5,924,090 A | * | 7/1999 | Krellenstein .................... | 707/5 |
| 5,995,971 A | * | 11/1999 | Douceur et al. ............ | 707/102 |
| 6,012,053 A | * | 1/2000 | Pant et al. ...................... | 707/3 |
| 6,014,659 A | * | 1/2000 | Wilkinson et al. .............. | 707/3 |
| 6,018,735 A | * | 1/2000 | Hunter .......................... | 707/5 |
| 6,023,683 A | * | 2/2000 | Johnson et al. ................ | 705/26 |
| 6,026,398 A | * | 2/2000 | Brown et al. ................... | 707/5 |
| 6,111,578 A | * | 8/2000 | Tesler .......................... | 345/850 |
| 6,125,361 A | * | 9/2000 | Chakrabarti et al. ........... | 707/3 |
| 6,157,922 A | * | 12/2000 | Vaughan ...................... | 706/46 |
| 6,230,154 B1 | * | 5/2001 | Raz et al. ....................... | 707/3 |
| 6,259,451 B1 | * | 7/2001 | Tesler .......................... | 345/419 |

FOREIGN PATENT DOCUMENTS

| | | | | |
|---|---|---|---|---|
| EP | 0 885 424 B1 | * | 5/2000 | ........... G06F/17/30 |
| WO | WO 98/49637 | * | 11/1998 | ........... G06F/17/30 |

OTHER PUBLICATIONS

Sullivan, Dan "Unlock the Hidden Value in Documents" Oracle ConText Version 2, Databased Web Advisor, v16, n2, Feb. 1998, pp. 38–41.*

* cited by examiner

*Primary Examiner*—Shahid Alam
(74) *Attorney, Agent, or Firm*—Blakely, Sokoloff, Taylor & Zafman LLP

(57) ABSTRACT

The present invention allows an item to automatically be classified using its attributes based on a classification schema and a knowledge base. The invention can include selecting a first attribute of the item, designating a first search strategy comprising the value of the first attribute applied to operate upon data records in a first database, selecting a second attribute of the item; designating a second search strategy comprising the value of the second attribute applied to operate upon a second subset of data records in a second database, forming a search hierarchy comprised of the first search strategy followed by the second search strategy, executing the search hierarchy, and selecting at least one classification for the item based on the search.

35 Claims, 12 Drawing Sheets

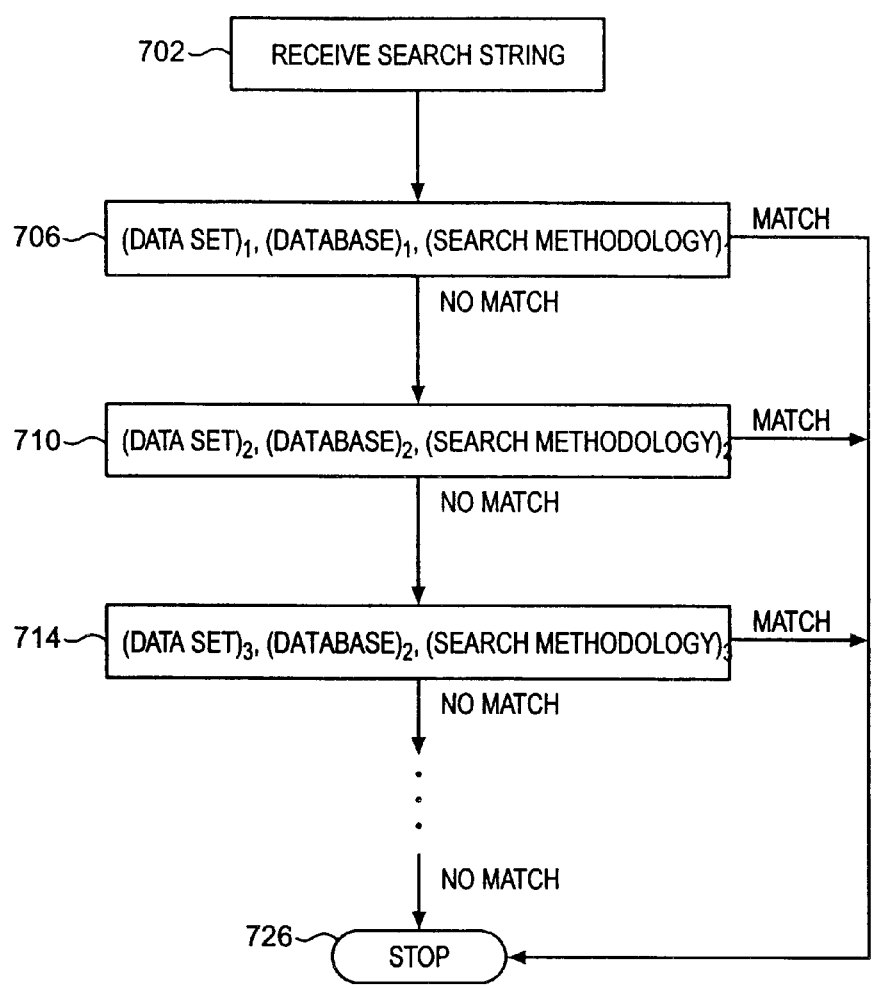

AUTOMATED CLASSIFICATION OF ITEMS USING CASCADE SEARCHES

CROSS-REFERENCE TO RELATED APPLICATIONS

This application is a contitiuation-in-part of prior application Ser. No. 09/900,733, filed on Jul. 5, 2001 and prior application Ser. No. 10/086,329, filed on Feb. 27, 2002, which is a divisional of Application Ser. No. 09/393,994 filed on Sep. 10, 1999 entitled "Sequential Subset Catalog Search Engine", of Neal, et al, issued as U.S. Pat. No. 6,324,534.

BACKGROUND OF THE INVENTION

1. Field of the Invention

The present invention relates generally to the field of automated classification of items of, for example, an electronic catalog into categories based on a knowledge base. More particularly, the invention relates to classifying an item utilizing cascading search methodologies on selected sets of data from one or more databases.

2. Description of the Related Art

In the creation of an electronic catalog, content is typically received in an unclassified form or a form which is classified differently than is desired. For example, if a uniform schema of classification is to be used for content that is obtained from many different sources, the content must be reclassified to be consistent with the uniform schema. Typically, classifying new content requires an individual familiar both with the subject matter of the new content and the classification schema into which the material is to be classified. The process of manually classifying a large catalog of new items is time consuming and expensive. As a result, many electronic catalogs contain multiple and inconsistent classification schemas within the single catalog. This makes it more difficult to find items and to compare different items which may be classified into different categories.

For large groups of documents, classification systems have been developed which analyze the text of the documents to try to connect documents that have similar text. Various different complex schemas have been employed so that documents are not grouped together simply because they contain the same words. The classification systems have been developed to group documents together that have similar topics. Nevertheless, the precision and accuracy required in grouping similar documents together is not as high as that required in grouping items together to create an electronic catalog when that catalog is to use a single classification system for content from many different sources.

BRIEF DESCRIPTION OF THE SEVERAL VIEWS OF THE DRAWINGS

The appended claims set forth the features of the invention with particularity. The present invention is illustrated by way of example, and not by way of limitation, in the figures of the accompanying drawings in which like reference numerals refer to similar elements and in which:

FIG. 7 is a flow diagram of a cascaded search process across multiple databases suitable for use in the present invention.

BRIEF SUMMARY OF THE INVENTION

Figure 1:
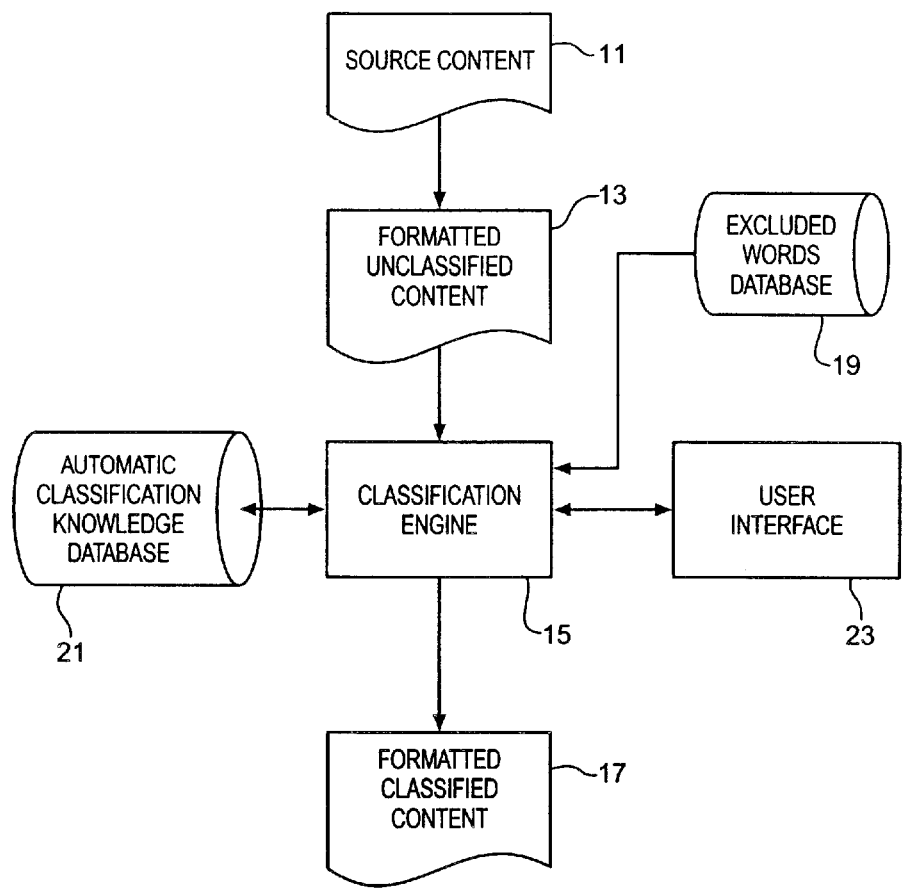
FIG. 1 shows a block diagram of a system for classifying items suitable for use in implementing the present invention.

The present invention allows an item to automatically be classified using its attributes based on a classification schema and a knowledge base. The invention can include selecting a first attribute of the item, designating a first search strategy comprising the value of the first attribute applied to operate upon data records in a first database, selecting a second attribute of the item, designating a second search strategy comprising the value of the second attribute applied to operate upon a second subset of data records in a second database, forming a search hierarchy comprised of the first search strategy followed by the second search strategy, executing the search hierarchy, and selecting at least one classification for the item based on the search.

In another embodiment the invention can further include determining a confidence score for each selected classification for the item and comparing confidence scores for all selected classifications and classifying the item in at least one of the selected classifications based on the confidence score comparison.

In another embodiment, the invention can further include presenting the selected item classifications to a user, receiving a designation from the user of at least one selected item classification, and classifying the item in the designated classification.

DETAILED DESCRIPTION OF THE INVENTION

The present invention can be broadly considered in terms of three basic elements. The first element is to develop or use an existing classification system that is to be applied to the object that is to be classified. The second element is to develop or use an existing electronic database of objects classified using the desired classification system and then to process this database into one or more electronic knowledge databases. The existing electronic database can be developed or added to as items are classified. This electronic knowledge database finds and positively weights words, tokens or symbols that are commonly associated with items in a given classification. It also finds and negatively weights words or symbols that are frequently associated with items across a proportionately large number of classifications. The third element is to classify the new items by comparing the words and symbols associated with each item to those in the knowledge database. The developed or existing classification system provides more consistent results if it has a fully developed classification taxonomy, and if the electronic knowledge database of content fully utilizes this developed classification taxonomy. In addition, to compare the words and symbols, a text or symbol based search engine is needed.

In the present invention, a word, token, symbol or descriptive term can be considered as one or more characters used to represent a concept in a language or a specialized subject matter. In western languages, this is typically represented by a series of characters separated by a space or a grammatical punctuation. In eastern languages, this is typically represented by a single character or a short group of characters. A category can be considered to be a name for a group of products sharing one or more similar characteristics. Similarities can-be in form, function or other types of associations. An example of a category would be "writing instruments" or "desk accessories". The item that is to be classified can be a product or a service or a concept. The item that is to be classified can be tangible or intangible. The present invention will be described in terms of products that may be found in an office supplies catalog. However, a wide range of different items covering any subject matter and in any language can be classified using the present invention.

The present invention can use a two-step approach to automatically classifying items. The first step is to create a set of categories that can be used to group like items as in the classification system discussed above. In the present example, categories have names that describe which items should be in that category, for example, "waste containers". The categories can also have aliases, i.e. alternate or synonymous category names, for example, "waste containers" could have the aliases "trash cans", "dust bins", and "waste paper baskets".

FIG. 1

As shown in FIG. 1, the present invention can be considered as beginning with source content 11. The source content is then organized in a way that allows it to best take advantage of the present invention. The source content is typically an electronic catalog in some form, typically having a list of items each associated with some descriptive terms. As discussed above, the items can be tangible or intangible, documents, services, software or any other type of items capable of being described. For purposes of illustration, an example of writing instruments will be used. The catalog accordingly lists a large number of different writing instruments, pens, pencils, markers, highlighters etc. A particular example of such an item would be one particular rollerball pen. This item can have a number of descriptive terms associated with its various attributes, for example, a manufacturer: Pentel, a manufacturing part number: PENK105A and a description: hybrid gel rollerball pen, fine, black. The item may also be associated with a supplier, for example, Corporate Express and a supplier part number, for example, PEN05060.

For purposes of the present invention, the classification process is aided if the item's description is organized or formatted. This formatting typically involves assigning the descriptive terms to particular fields. For example, the manufacturing part number can be assigned to a field of manufacturer part numbers and so on. Alternatively, the descriptive terms can be used as is without any particular organization being applied in advance. The organization results in formatted unclassified content 13.

The formatted content 13 can be represented as a table, a database, HTML (Hyper Text Mark-up Language), XML (Extended Mark-up Language) or delimited text, for the item just discussed, the item could be put in a table as shown in Table 1. In a typical application, the content 13 will include hundreds or thousands of items.

TABLE 1

| Mfg Name | Mfg Part No. | Description | Sup. Name | Sup. Part No. |
| --- | --- | --- | --- | --- |
| Pentel | PENK105A | Hybrid gel rollerball pen, fine, black | Corporate Express | PEN05060 |

A particularly useful attribute can be a classification. The source content may come organized into a particular taxonomy. If the existing item classifications can be mapped into the standard reference classifications, then many items can automatically be classified. Typically, the existing categories will be more inclusive than the closest standardized categories in some instances and less inclusive in other instances. As a result, the existing taxonomy can be used only with caution. Some classification taxonomies have found widespread use, such as the UNSPSC (Universal Standards Products and Services Code). If such a well-known taxonomy has already been applied to the source content, it can be leveraged to automatically classify some items and to aid in classifying others. As an example of an aid, if the classification engine returns a list of candidate classifications, any that do not overlap with the given UNSPSC category can be excluded.

Often the source content is available in the form of a catalog with a large number of different items and each of the descriptive terms is already organized into a set of consistent attribute fields. This format of the source content can easily be applied to the present invention as described below. The formatted unclassified content 13 is supplied to a classification engine 15 that, in the process described below, classifies items in the source content and accordingly creates formatted classified content 17. The classification engine uses a stop list or excluded words database 19, an automatic classification knowledge database 21 and a user interface 23 to perform these tasks. The stop list is a list of words which are frequently associated with items in a particular category, but also are used in describing products in many other categories as well. As a result, these words do not uniquely identify items in any one particular category. The stop list allows these words to be excluded from both the knowledge database and from any searches for categories. Because these words are common in many categories, they do not significantly reduce the number of accurate classifications but do increase the likelihood of mistaken classifications. The stop list is not required and the classification engine can operate without it.

The automatic classification knowledge database is a list of descriptive terms for various attributes. Each descriptive term is associated with a category. The list serves as the reference for classifying items in the source content. The reference list can be organized into fields where each field describes a different type of data. As discussed above, these fields can be such things as manufacturer names, descriptions of products, manufacturer part numbers, supplier names and the like. Each field contains sets of descriptive terms or words which are associated with different categories. The taxonomy schema of the automatic classification knowledge database serves as the model against which the source content will be classified.

The knowledge base can take the form of raw data collected from one or more different sources or the data can be processed into an engineered knowledge base in a variety of different ways. One type of processing is to filter the raw data through an excluded words database and to eliminate all redundant entries. Such an engineered knowledge base will be faster and more efficiently used in the context of the present invention than a knowledge base of raw data. Another type of knowledge base can be made up of a classification or taxonomy schema only. The classification schema will typically include a set of classifications and a description of the classifications possible, including some examples. The description can be compared by the classification engine against attribute values of the item to be classified. The classification schema can also be engineered to optimize efficiency or accuracy as discussed above. A further kind of knowledge base is a knowledge base of an alternate classification system. Such a knowledge base can have a set of classifications according to the schema that is to be applied reference to an alternative classification system against which the source content has already been applied, such as UNSPSC. This knowledge base allows items to be classified using an existing classification as discussed above and can be engineered just as the others can.

The user interface is typically a graphical user interface such as is commonly used on desktop computers and can include a display such as a computer screen or monitor and input devices such as keyboards and pointing devices. Any type of computing or digital interface device can be used including portable and laptop computers, PDAs (personal digital assistants) and fully functional graphical workstations. The user interface allows an operator to make key decisions and to make adjustments in any of the databases discussed above.

As mentioned above, the classification engine employs a search engine. The comparison or search can be defined in a variety of different ways. In one embodiment, a series of cascaded searches are conducted for each search view. A suitable approach for applying a series of cascaded searches is described for example in U.S. Pat. No. 6,032,145 issued Feb. 29, 2000, to Beall et al. assigned to the assignee of the present application, the disclosure of which is incorporated fully by reference herein. The cascading hierarchy of searches can begin with direct matches, then look for proximity, then a high count of relevant words, then fuzzy logic etc.

The input query to the search can be a word, token or symbol or a group of words, tokens, or symbols. For the example of Table 1, one search view might use "Pentel" and "PENK1OSA". Another search view might use "Hybrid gel rollerball pen, fine, black". Many other search strings are possible.

FIG. 2

Figure 2:
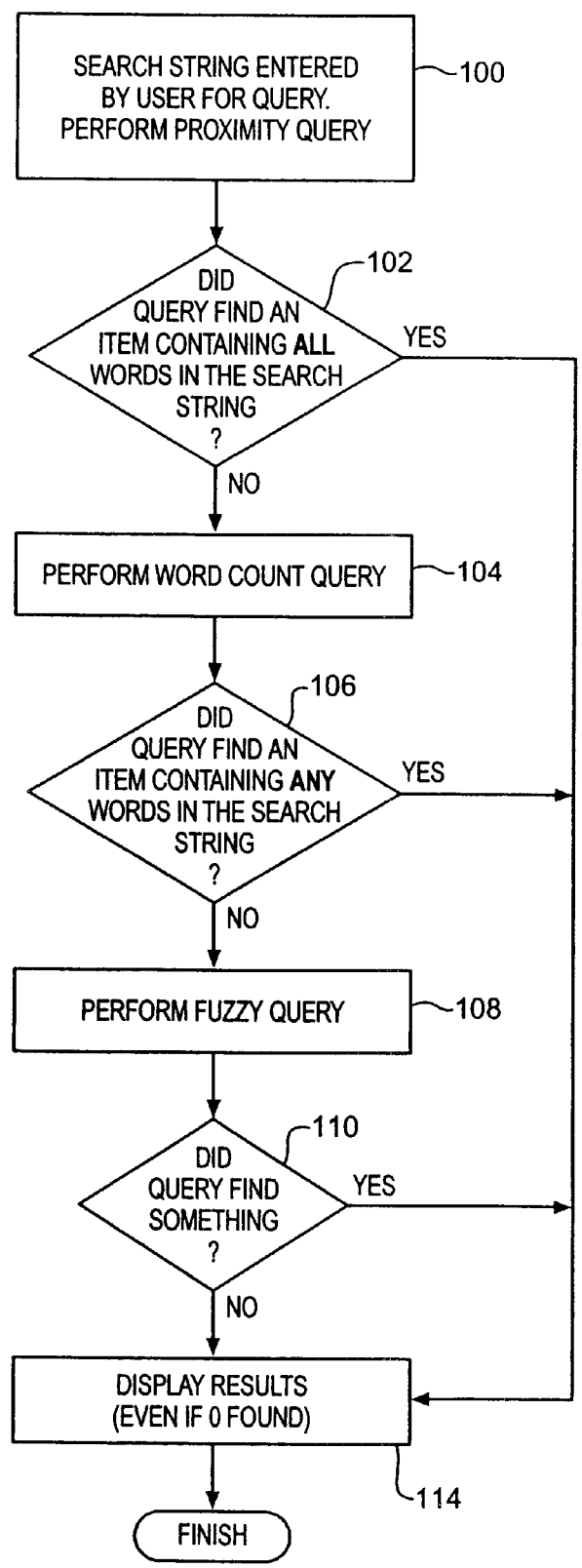
FIG. 2 shows a flow diagram of a cascaded search process suitable for use in implementing the present invention.

In one embodiment, the search engine operates as shown in FIG. 2. The search engine begins by performing a proximity query which will try to find an exact match of the search string within the database 21. Each record within the database is tested against the search string to find records that contain all of the search terms in proximity to each other. The highest quality match will be a record in which all terms appear in the same order as the search string. A lower quality match will have the terms in a different order, or may have the terms separated by other strings.

At the conclusion of the proximity query, the search engine checks to see if any matches were found, as shown in block 102. An exact match will lead the search engine to end the search. If no exact match is found, the search engine sequences to the next type of search strategy.

Block 104 in FIG. 2 shows the preferred second sequential search algorithm. Since no exact match has been found, the software performs a word count query in which individual words or search terms within the search string are checked against the products within the database 21. The strategy at this point is to find products within the database 21 that may match some of the descriptive terms in the search string. The word count query may also apply a stemming function to search terms to identify similar root words.

Block 106 test the results of the word count query to determine if any matches have been identified. If at least one item from the database has been returned by the search algorithm, the search is ended. Otherwise, the search engine executes the next algorithm in the sequence of search algorithms.

As shown in block 108, the next search algorithm in the sequence is preferably a fuzzy logic query. In this context, a fuzzy logic algorithm may also be known in the art as a "word wheel" or other name associated with an algorithm for testing combinations and permutations of the alphanumeric characters in the search string. For example, a user who enters a search string having a typographical error will not generally find an exact match within the database, but a fuzzy logic algorithm may select the desired product on the basis of similarity with the search string.

The search engine may also rank the degree of similarity between each matched database record with the search string. For example, records with a large number of alphanumeric character or token matches against the search term will be ranked higher than records with only a few matching characters. Ranking algorithms are found in several commercially available software packages.

There are other possible sequences of search algorithms, but in general it is desirable to execute the narrowest, or most specific, search first. The sequence should proceed with search algorithms according to the scope of each algorithm. For example, a search for the specific search string is the narrowest in scope, whereas a search for related search strings will be broader in scope because it will likely return a wider range of matches. Searches can also be conducted across multiple databases, as will be described further in reference to FIG. 7.

An additional type of search algorithm not specifically shown in FIG. 2 is a "soundex" or "sounds-like" search, in which the search string is tested against database records for similarity in sound. Such a search can be used.

If any match is found as a result of a search algorithm, the successive search algorithms will be skipped and the search engine will end the search. In the unlikely event that no matches were found after completion of the entire sequence of search algorithms, the search engine will proceed to the display block 114 with a message indicating that no products were found. Alternatively, the search engine can go to another search view.

To further increase the likelihood of finding a match, the search engine can have a list of synonyms for each attribute. The search algorithms can replace individual search terms with appropriate synonyms for purposes of matching data records. The attributes are normally used as part of an algorithm for finding matches, and the use of synonyms for the attributes gives additional flexibility to the range of search strings that will produce meaningful matches.

Another way to increase the flexibility of the search algorithms is to allow natural adjectives in the search string to help select certain attributes. For example, if there is a category for computers, and the category has an attribute for processor speed, then the adjective "fastest" in the search string could be used to select the fastest computer. Slower computers would be eliminated from the display list 302.

Figure 3:
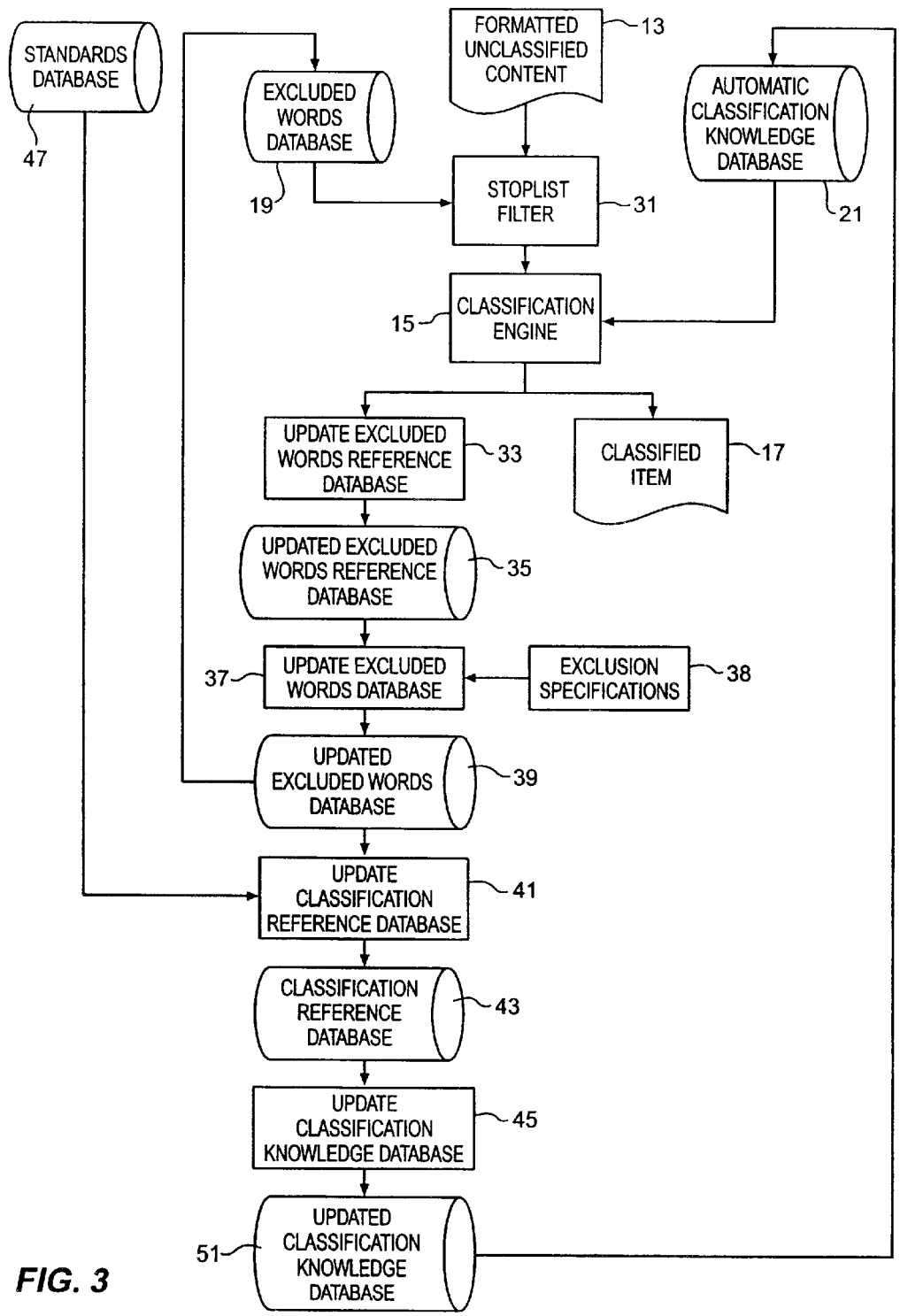
FIG. 3 shows a process flow diagram of the development of a knowledge database and a stop list suitable for use in implementing the present invention.

Yet another way to increase the flexibility of the search algorithms is to assign categories alternative roles such as, but not limited to, problem spaces and applications. In this embodiment, the items found by the query are actually predefined queries that generate lists of actual data records from the database. Thus, selecting a category becomes equivalent to submitting a predefined query to the database. FIG. 3

Referring to FIG. 3, the formatted unclassified content 13 is first filtered 31 through a stop list or excluded words database 19. It is then processed against the automatic classification knowledge database 21 or any other knowledge base in order to assign it to a category 15. This classification process is discussed in more detail with respect to FIGS. 4 and 5. The result is the classified content 17 of FIG. 1.

FIG. 3 shows how, in the process of classifying each item, the stop list 19 and the classification knowledge database 21 can be updated. This allows the accuracy of the system to improve as the base of classified content grows. As will be understood in the course of this description, continuously updating the two primary databases also allows the present invention to be deployed without any data from previously classified items. The stop list and the classification knowledge database can be built up based only on unclassified data as it is sorted.

In another embodiment, the classification knowledge database 21 can be created based on one or more standardized catalogs (not shown). These catalogs can be combined together and the combination can be used to build item descriptions of categories. In one embodiment, the standardized catalogs are all constructed using a common classification system which includes a number of items and, for each item, a number of attributes. For each attribute there are one or more descriptive terms regarding the item, each of which falls under a particular attribute or field. For example, a set of items compiled from two different supplier catalogs, showing attributes with the items and descriptive terms as values for the attributes is shown in Table 2.

TABLE 2

| ID # | Mfg Name | Mfg Part Num. | Sup Name | Sup Part Num | Description | Supplier Category |
|---|---|---|---|---|---|---|
| 01153 | Paper-Mate | PAP-45601 | XYZ Corp. | 421606 | Flexgrip with Ballpoint Pen, Blue | Pens |
| 02712 | Sanford | 22952 | XYZ Corp. | 382246 | Tri-grip, Retractable Ballpoint Pen | Pens |
| 05363 | Pilot | 35336 | ABC Corp. | 302257 | Precise VS Rollerball Pen, Red | Desk Supplies |

In a standardized reference catalog, the content has already been classified and contains attributes with values. To create the classification knowledge database, all of the attribute values for all of the items in each category can be combined to create a single meta-item for each category. The reference list of meta-items is the automatic classification knowledge database 21. It can be independently maintained and can allow searches to be simplified. An alternative structure for the classification knowledge database is a reference list of descriptive terms each linked to a particular attribute or field, a category, and a weighting. The search engine searches for a match to any of the descriptive terms in the reference list and then, from the matching term, can link it to the associated category and weight. Mismatches can be avoided by limiting searches to terms that occur in the same field for both the item to be classified and the meta-item.

The excluded words database 19 can be created independently of language using statistical methods. The stop list can also be developed by analyzing the knowledge database 21 and formatted unclassified content. An example of such criteria 38 is as follows: a word can be added to the stop list if 1) it has a particular length of characters, 2) the word is used to describe at least x percent of items in a category and 3) the word is used to describe at least x percent of the items in at least y percent of all of the categories. This statistical approach requires an analysis of an existing database or it requires an ongoing analysis of items to be classified. However, it does not require any knowledge of what the words mean or of their usage in any particular field. The stop list in most situations would have words such as "and" "or" "the" and in many fields may include words such as "steel", "viscosity", "general", "voltage" etc. The stop list may vary depending on the types of items that are to be classified. Certain groups of items may not be distinguishable based on certain words while other groups of items may be.

The excluded words database 19 can be built and maintained starting with the set of exclusion specifications 38. As discussed above, the exclusion specifications can include the length of the descriptive term and its frequency in items across all categories as shown in Table 2. Accordingly, extremely short descriptive terms and descriptively terms which occur frequently in many different categories can be excluded. The excluded words database 19 built this way is used to modify meta-item descriptions so that the excluded words can be excluded from searches in the automatic classification.

Table 3 shows a sample set of additional criteria from the exclusion specifications 38 for building the excluded words database. These criteria work well for electronic catalogs in the English language that have a large variety of different products and several thousand categories.

TABLE 3

| No. of characters | % of categories |
|---|---|
| 1 | 0 |
| 2 | 3 |
| 3 | 5 |
| 4 | 10 |
| 5 or more | 15 |

According to Table 3, words, tokens, or symbols with one character or letter are excluded completely from the classification knowledge database 21. Words with two characters are excluded if they occur in more than three percent of the total categories etc.

After an item has been classified 15, the information from that item can be used to update both the stop and the classification knowledge database 21. The data can first be applied to build and update 33 a stop list reference database 35. The excluded words reference database can be used as a reference to update 37 the excluded words database. In one embodiment, the excluded words reference database includes a list of every word, symbol, or token ever found in a classified item. Each word is associated with a list of all the associated categories. In other words, each distinct category in which an item's description contained that word, can be listed. From this, and the total number of possible categories, which can be derived from the stop list reference database, the percentage of categories which contain a particular word in any item's description can be determined. This is the value used in Table 2 above.

For example, the word "and" will likely occur in the descriptive terms for many items in many different categories. Accordingly, it will likely be a part of the excluded words database 19. The word "ballpoint" will likely occur in the descriptive terms only for pens. Pens will be in one or only a few categories. Accordingly, "ballpoint" will probably not be in the stop list. If an operator has some knowledge of the words or terms in the source content descriptions, some words can be added to the stop list before the system is in operation. Typically these would be the common short words such as prepositions, articles, conjunctions and common units of measure (e.g. meter, gram, etc.). However, as can be understood from this discussion, the stop list can be generated from classified items without any knowledge of the meaning of its terms or the language involved.

As shown in FIG. 3, the stop list reference database 19 is updated 33 by analyzing the words, terms, symbols or tokens of the newly classified item 17 to create an updated reference database 35. This reference database can contain all or most of the words encountered by the system. By applying specifications 38, discussed with respect to Table 2, certain ones of the words in the reference database can be selected to update and maintain 37 the stop list. The updated stop list 39 is fed back into the stop list 19 to be applied to the stop list filter 31 used for classifying items.

The newly classified item can also be used to update 41 the classification knowledge database 21. As shown in FIG. 3, the descriptive terms of the newly classified item are used in this updating and are applied against a standards database 47. Note that any words already in the stop list are filtered out 31 of the updating process. This database holds a set of standards 47 for application to the meta-items of the classification knowledge database 21. These standards can apply to the names of categories, the attributes of the categories and aliases for the category names. These standards can be used to filter through the meta-item descriptions and to further refine the item descriptions that have been built.

As with the stop list, a classification knowledge reference database 43 can be used as a source of information to determine which if any words to use in updating 45 the classification knowledge database. In one embodiment, the reference database has a list of each category. A list of all words encountered in descriptions of items in that category is associated with each category name, together with the number of items described by each word. Accordingly, if a word is used to describe most of the items in a category such as "ballpoint" then it can be used to update the classification knowledge database. Similarly a word such as "and" may also be used in the description of a large number of items in a particular category, but it will be excluded from the classification knowledge database 21 by the stop list 19.

Each term-category combination can be weighted based on the percentage of items in that category which contain at least one instance of the word. For example, a term that is contained in less then 5% of the items in the category can have a weight of 1. A term contained in 5% to 25% of the items in a category can have a weight of 2. A term contained in 25% to 65% of the items in a category can have a weight of 4 and a word contained in 65% to 100% of the items in a category can have a weight of 7. Each of the descriptive terms can also have a number of aliases or synonyms so that words having similar meanings can be grouped together. This can be done statistically without requiring any knowledge of the items or of the language involved in creating the electronic catalogs.

The words in the reference database are used to create 45 an updated classification knowledge database 51 which is fed back into the classification knowledge database 21 used by the classification engine 21. Accordingly, the classification knowledge database contains words which frequently occur in items in each category. The classification engine 15 can look at any classified product database or product catalog beyond the standards database 47 and automatic classification knowledge database 21 and use the approaches described with respect to FIGS. 4, 5 and 6 to classify an item. This classified product database can contain a large number of items or zero items. As each item is classified the database becomes more accurate for future classifications. With each classification, additional information about a classification can be added to the engineered knowledge base after the item is classified.

The automatic classification knowledge database 21 or any other knowledge database can be used to build knowledge database views. The purpose of the views is to restrict the fields or the databases that contain searchable knowledge to those that match the type of descriptive terms that are currently used to classify an item. Multiple views can be created to capture the knowledge appropriate to the applicable search method. For example, one view can be manufacturer name and manufacturer part number. This view can be applied to a particular search directed to find this information using a direct match. Another example would be a short description. A different kind of search would be applied to match a short description of an item to be classified to one for the meta-items in the knowledge database. In one embodiment, these views are used for searching instead of searching the entire knowledge database. In another embodiment, views are not used. Instead of restricting the fields or the databases, searches are performed through the entire database or databases. In such an embodiment, some or all of the views as described herein can be considered simply as queries.

FIG. 4

Figure 4:
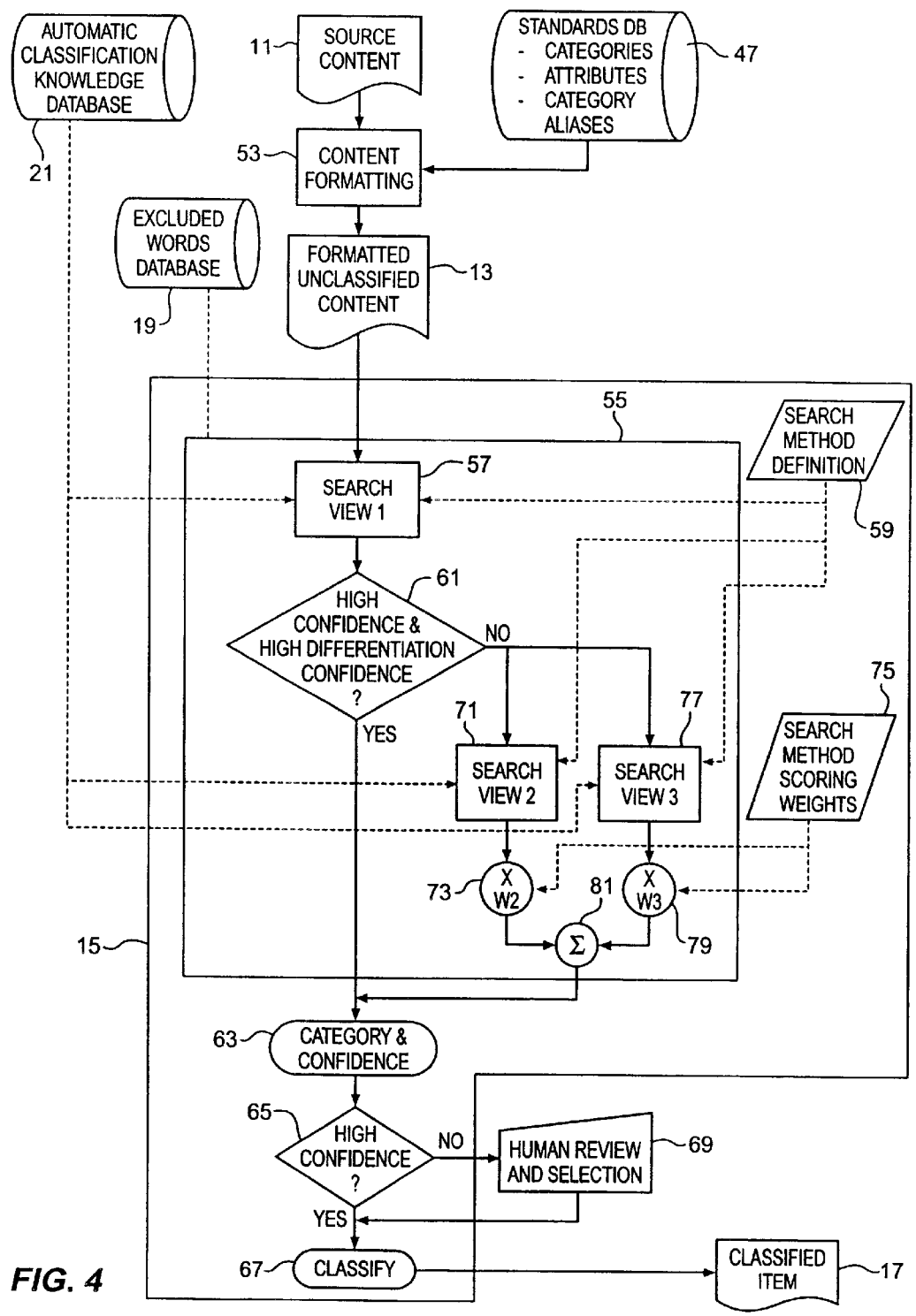
FIG. 4 shows a process flow diagram of categorizing an item suitable for use in implementing the present invention.

FIG. 4 shows one diagrammatic view of automatically classifying the source content 11. According to one embodiment of the present invention, as discussed above, the source content is formatted 53 by applying standards from the standards database 47 to arrive at formatted but unclassified content 13. This formatted unclassified content is applied item by item, to a search engine 55 within the classification engine 15. The search engine as described with respect to FIG. 2 takes a first search view 57 and compares it to descriptive terms in the automatic classification knowledge database 21. In one embodiment, the excluded words database 19 is applied to limit the descriptive terms in the first search view. While these terms have been excluded from the knowledge database, they may occur in the formatted content 13. By excluding them from the search, the speed and efficiency of the search can be improved.

Search results can be scored heuristically. The weighting factors for confidence can include the type of search that is used. For example, a proximity search, a spell checked search, a word count search and a matching search can all be used as further described with respect to FIG. 2. In addition, the view can be used as a weighting factor. For example, if the search is performed for a matching part number and a matching part number is found, this can be given a high confidence rating that the two items with the same part number belong in the same category. On the other hand, if the view is for a short description of the item and a description is found during the search or comparison with similar descriptive terms, this result would be assigned a lower confidence score. The results from the searches can be averaged or applied to create a weighted average to give a total score.

The classification confidence system can be designed so that a high confidence score not only reflects confidence that a category is likely to be correct, but also that only one category is likely to be correct. These two aspects can be rated separately. Confidence in a selected category can be associated with an absolute score. If there is a high degree of correlation between an item's description and the description in the knowledge database, this will result in a high absolute score. With the cascading search technique patent, each subsequent search uses broader criteria. As a result, there is lower confidence in the correctness of the result in each subsequent search. The confidence that a returned category is correct can be estimated by assigning a score corresponding to the likelihood of correctness in each technique. In an exact match search, the confidence may be much higher than for a search looking for any word that matches or for a proximity search.

If the confidence is high, then the category retrieved and its confidence can be returned to a user interface or used to classify the item directly. In other words, the category and confidence are compiled 63. If an item has a high confidence level 65 then it can be classified directly 67. If the confidence level is low, then the results can be sent to a user interface 23 for review and selection by an operator 69. The operator selection will then be classified 67. If the confidence level scoring results are not high, then a new search view 71 can be created. For example, if the first view was made up of manufacturer part number and name, the second search view can be supplier part number and name. This can be searched again though a cascading set of search definitions 59 and the results of the search can be scored 73 using scoring weights 75.

A third search view 77 can be presented as well as fourth, fifth and subsequent search views. The results of these search views can also be weighted 79 using the same scoring weights 75 as are applicable to the corresponding search. In one embodiment, results from the comparisons of several different search views can be combined 81 with the weights to develop a composite category scoring and weighting. As described above with respect to the first search view, this consolidated confidence score and category ranking can then be evaluated 63. If there is a high confidence 65, it can be classified directly or for lower confidence results, they can be submitted for human review and selection 69. As can be understood from the above, as a result, the classification engine 15, using the search engine 55, produces a classified item 17.

The determination as to whether or not to automatically classify an item can be made using thresholds. The thresholds can be made configurable by a system manager depending upon the need for accuracy as balanced against the amount of operator interaction desired. In this approach, the confidence score at each search view is compare to a configurable threshold. If the score is above the threshold, then it is automatically classified. If it is below the threshold, then it is submitted to a user for human review and selection. Since the thresholds are configurable, they can be modified as the knowledge base is improved as shown in FIG. 3. A variety of other approaches can also be applied to the confidence scores to determine whether to submit an item for human review.

FIG. 5

Figure 5:
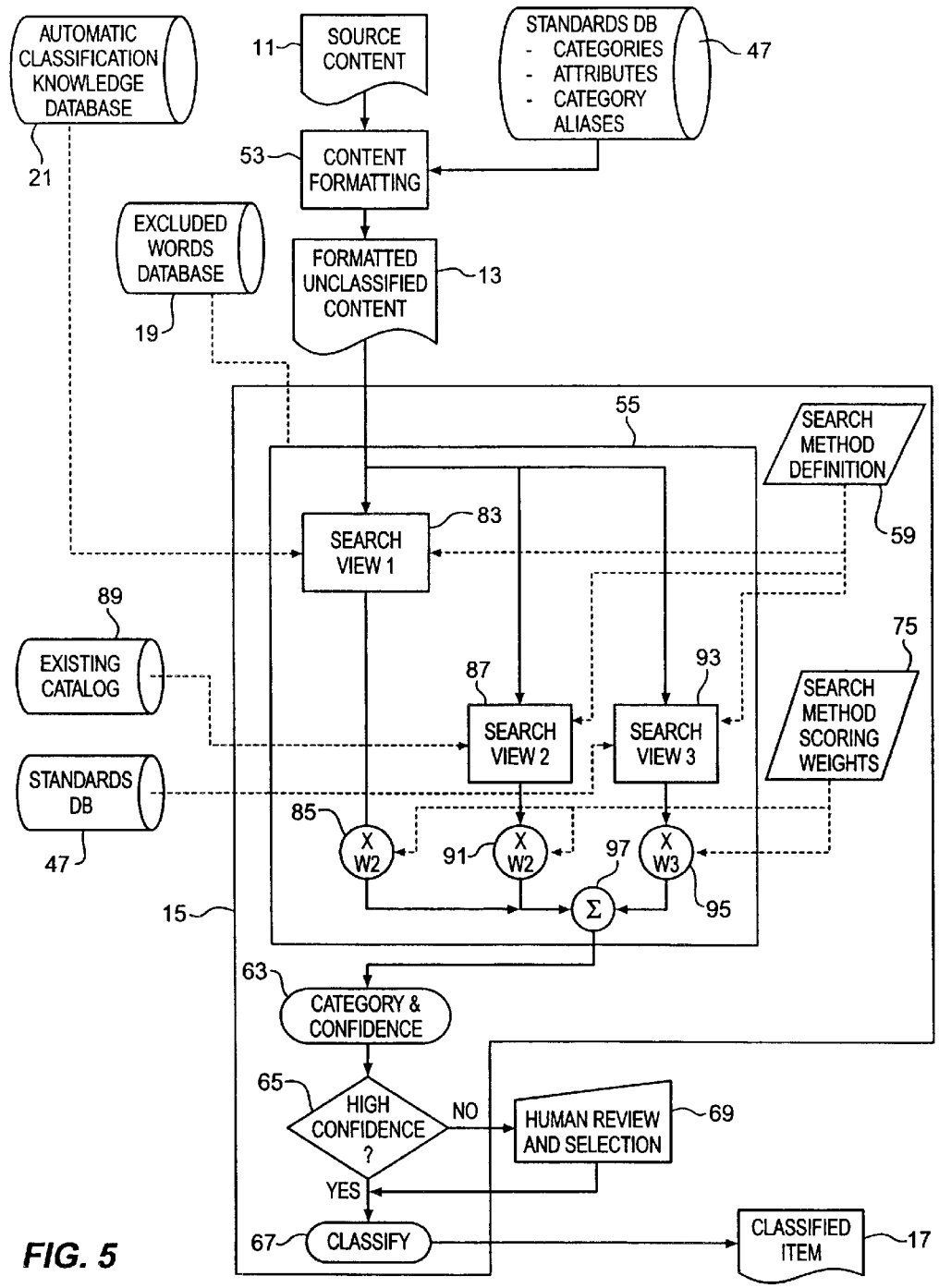
FIG. 5 shows an alternative process flow diagram of categorizing an item suitable for use in implementing the present invention.

FIG. 5 shows another diagrammatic view of automatically classifying the source content 11. As before, the source content is formatted 53 by applying standards from the standards database 47 to arrive at formatted but unclassified content 13. This formatted, unclassified content is applied item by item, to the search engine 55 within the classification engine 15. The search engine in this case takes different views which are based on different knowledge databases instead of on different search terms. In this example, all search views can be applied to the same descriptive terms. The description shown in Tables 1 and 2 can be particularly useful in such a case. Accordingly, the search engine takes, for example, the description and applies it to the first search view 83. This search view compares the description to descriptive terms in the automatic classification knowledge database 21. As before, the excluded words database 19 is applied to limit the descriptive terms in the first search view and improve the speed and efficiency of the search. The results are scored and weighted 85.

If confidence is high, then the category retrieved and its confidence can be returned to a user interface or used to classify the item directly. In other words, the category and confidence are compiled 63. If an item has a high confidence level 65 then it can be classified directly 67. If the confidence level is low, then the results can be sent to a user interface 23 for review and selection by an operator 69. The operator selection will then be classified 67. If the confidence level scoring results are not high, then a new search view 87 can be created to classify the item against a different knowledge base. This knowledge base can also be searched though a cascading set of search definitions 59 and the results of the search can be scored 91 using scoring weights 75.

In the illustrated example, the second search view 87 compares the description against an existing catalog 89. This can be any catalog that conforms to the classification system that is desired. The existing catalog can have formed the basis for the classification knowledge database 21. However, in contrast to the classification knowledge database, in this example, the catalog contains raw data. It is not engineered to contain a single carefully edited meta-item for each category. Instead, it contains an unfiltered list of items. As a result, a matching similar item may be found in the catalog that could not be found with a meta-item. The results of this search view, if any are also scored and weighted 91.

A third search view 93 can compare the same description to another knowledge base. In this example, the third knowledge base is the standards database 47. As mentioned above, the standards database is an engineered knowledge base of the classification schema and contains category and attribute names for each category. It also contains aliases for each of these names. So, for example, with the item of Table 1, the description includes the words "pen" and "rollerball". These words may appear in the standards database as a category name or an alias for a category name. Such a match would then return the "pens" category as a match. The results of the third search view are also scored and weighted 95.

As mentioned above, the results of the three and any other search views (not shown) are weighted 85, 91, 95 using the appropriate scoring weights 75 as are applicable to the corresponding search. The results from the comparisons of the several different search views can be combined 97 with weights to develop a composite category scoring and weighting. As described above with respect to FIG. 4, this consolidated confidence score and category ranking can then be evaluated 63. If there is a high confidence 65, it can be classified directly or for lower confidence results, they can be submitted for human review and selection 69. A result, the classification engine 15, using the search engine 55, produces a classified item 17.

The approaches shown in FIGS. 4 and 5 can be combined on a per item or per attribute basis or used independently.

For example, the multiple views of FIG. 5 can be used in each search view of FIG. 4 to compare individual attributes against several different knowledge databases. Alternatively, the search views of FIG. 4 can be compared in each search view of FIG. 5 to compare multiple attributes against a single reference. These approaches can all be combined to arrive at a composite weighted and scored set of candidate categories.

The present invention can be used with only one of the three reference sources 21, 47, 89 shown in FIG. 5. Starting with the standards database, the classification knowledge database can be developed as items are classified as shown in FIG. 3. Alternatively, an existing catalog can be used without the other two references. As discussed above, the present invention can also be used with no reference at all. The first item is classified manually and the second item is compared to the first item. The third item is compared to the first and second items and so on until the whole catalog is developed. As a further benefit, the present invention can be applied independent of any subject matter domain of the items and of the item classifications, the subject matters domains can include electronic, office products, and medical supplies and many more. The present invention can also be applied independent of the language of the item and independent of the language classification system.

FIG. 6

Figure 6A:
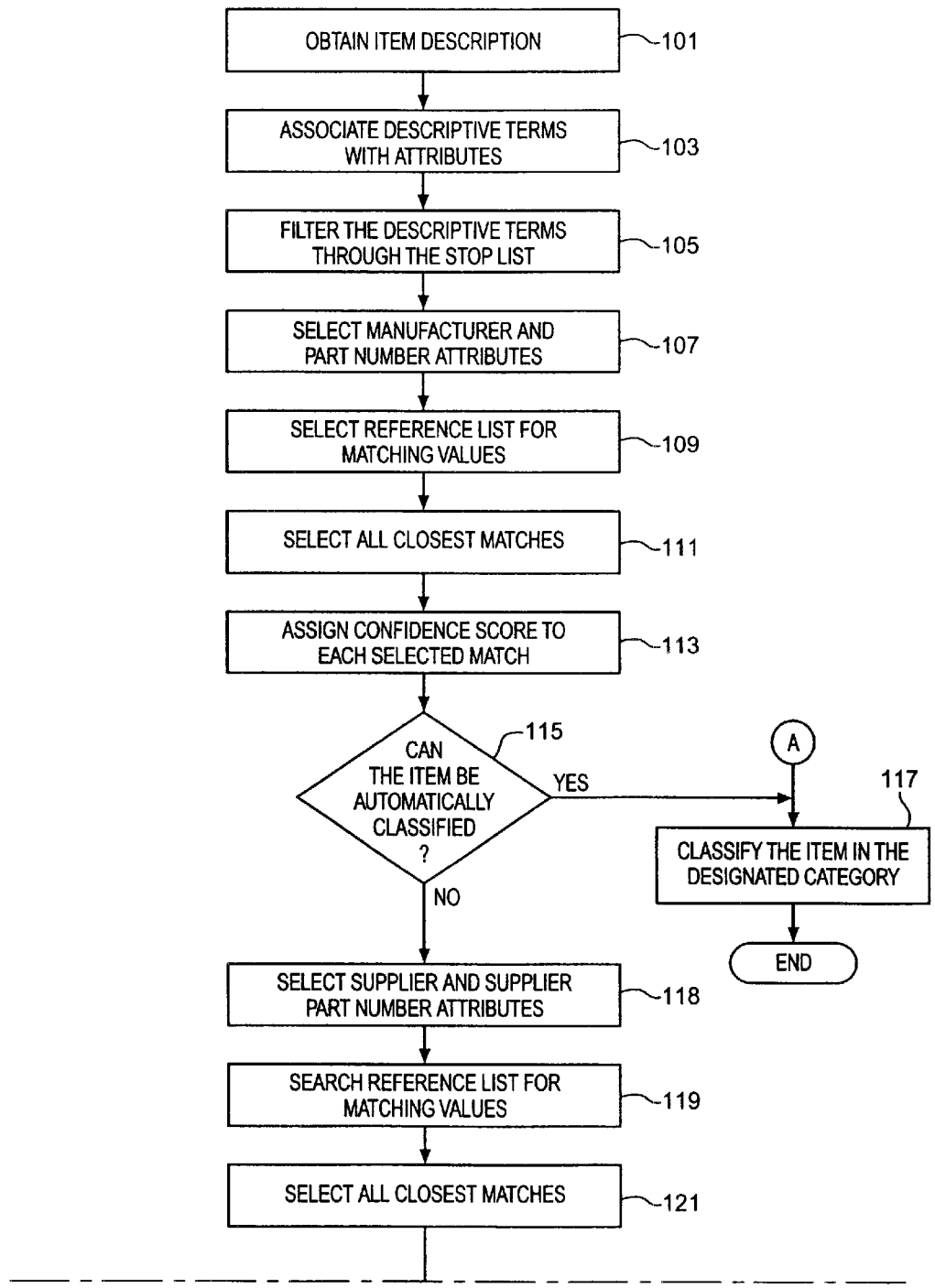
FIGS. 6A, 6B and 6C show a flow chart showing a process for classifying an item according to one embodiment of the present invention.
Figure 6B:
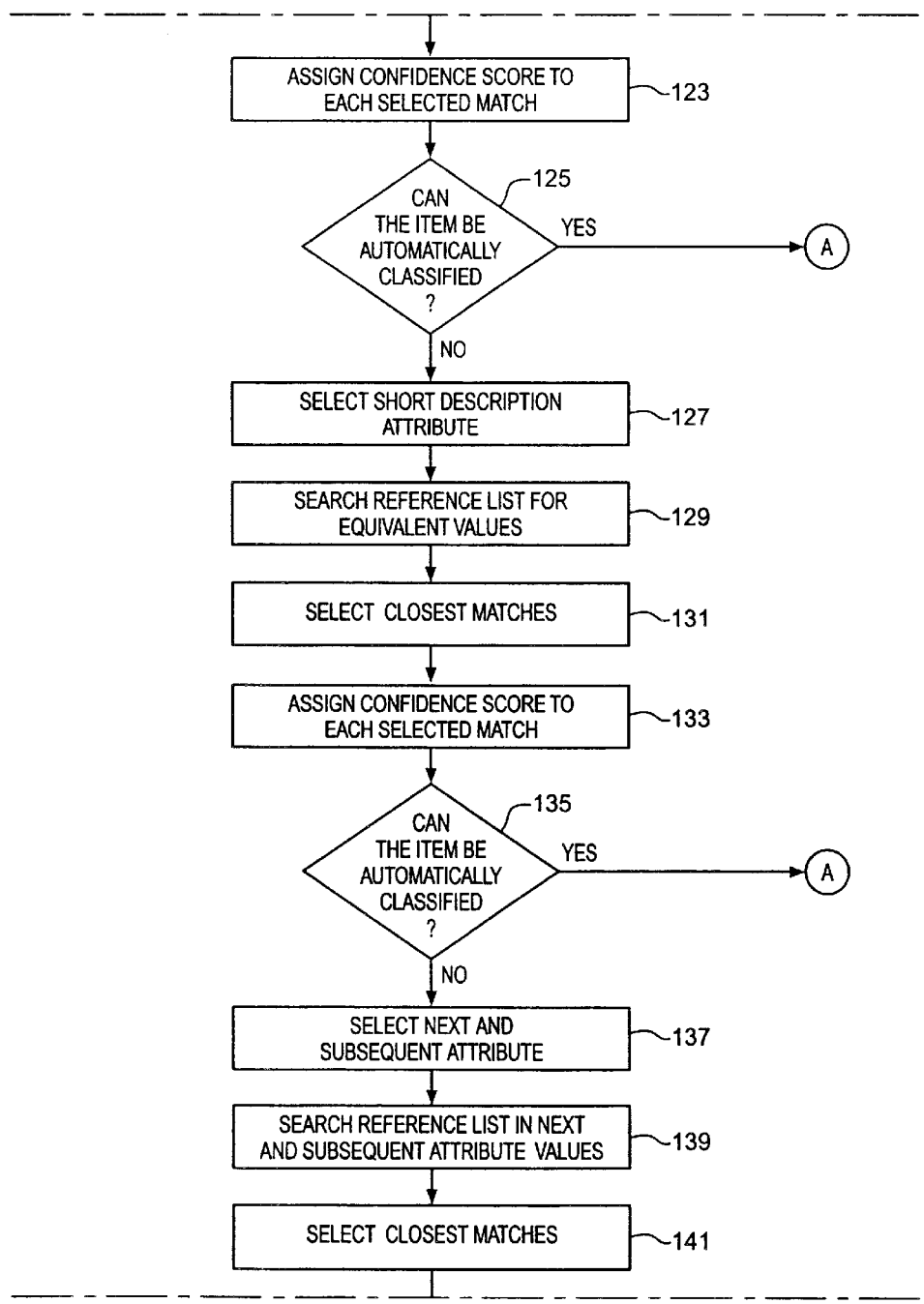
Figure 6C:
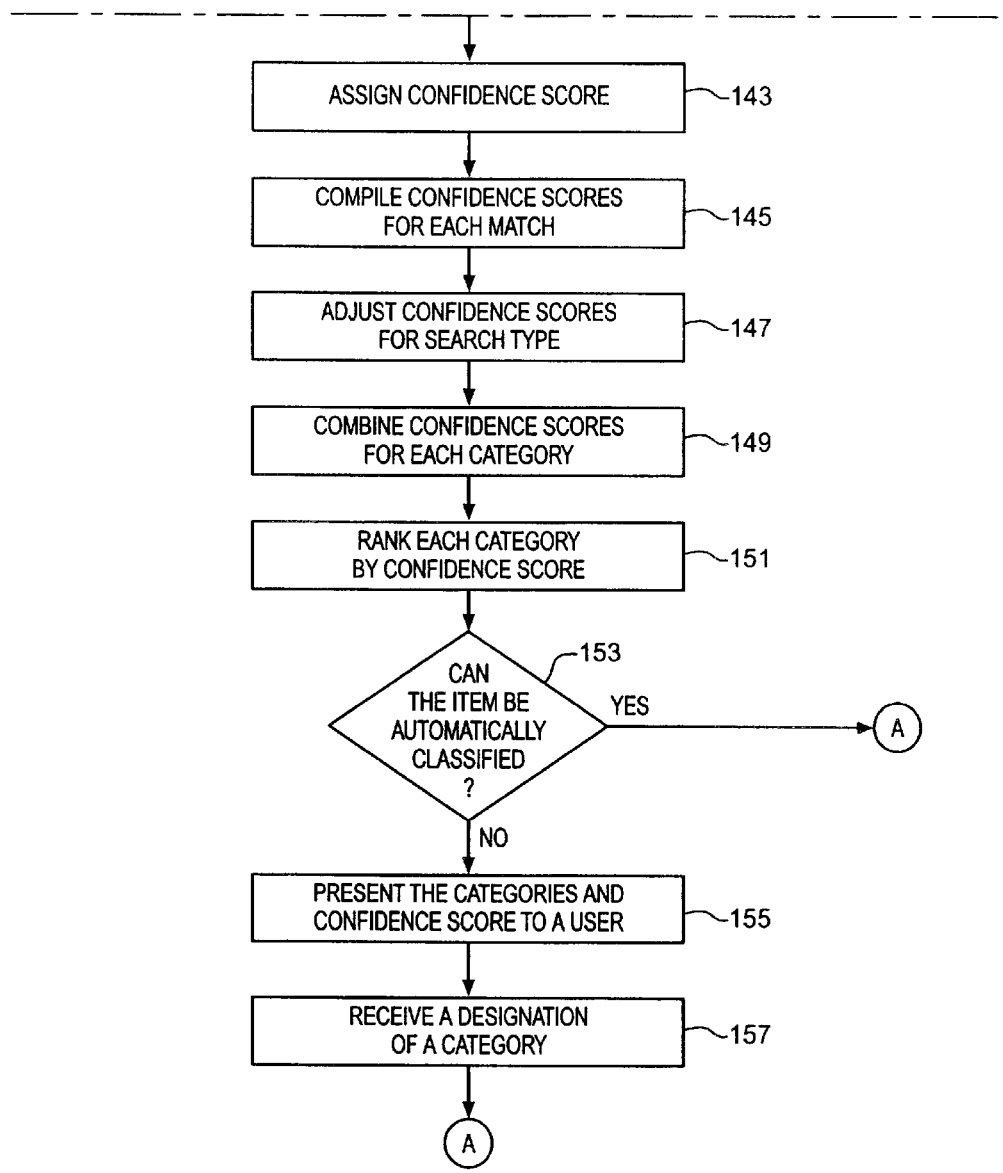

FIG. 6 presents a method for implementing the present invention in another embodiment. This embodiment begins by obtaining an item description 101. The item description comes from the source content 11 of, for example, FIG. 1. The item description contains an item with a number of descriptive terms. The descriptive terms are then associated with attributes of the item 103, as shown for example, in Table 1. The item descriptions are filtered 105 through the stop list or excluded words database 19. After the descriptive terms are filtered, a first search view is selected. In one example, this first search view is the manufacturer and manufacturer part number attributes 107. The descriptive terms for these attributes are applied in searching the reference list or classification knowledge database 21 for matching values 109.

One example of the manufacturer name can be Pentel and the manufacturer part number can be PENK105A (see e.g. Table 1). The reference list or knowledge database 21 may contain, for example, descriptive terms similar to the descriptive terms of the selected item. For example, a search for matching attribute values may return Pentel for manufacturer name associated with the following manufacturing part numbers PENK105A, PENK105B, PENK106A, CR13-A, B1234. The search engine then selects the closest matches 111. In the present example, PENK105A is an exact match and the others are less close. The confidence ranking for each of these returns from the search can be scored based on the closeness of the match. Accordingly, a confidence score is assigned to each selected return based on how closely the selected return corresponds to the descriptive term of the selected item.

If the item can automatically be classified 115 then the item is classified in the highest confidence category 117. A direct match is assigned a high confidence score and a manufacturing part number attribute is also assigned a high confidence score. Accordingly, if, on a search for Pentel and PENK105A, a direct match with Pentel and PENK105A is found, the confidence score can be assigned a very high value and the item can be classified. In essence, the particular item in the source content 11 has already been classified in the knowledge database 21. Accordingly, once the same item is found again, it can be classified the same way that it is in the reference list. On the other hand, if the matching part number was not available in the knowledge database then the search results would leave only PENK105B, PENK106A, CR13A and B1234. The search criteria would identify PENK105B and PENK106A as close matches. These would be assessed relatively high confidence scores. In an attribute such as manufacturing part number that has a high confidence score, the resulting confidence score, while less than for a direct match would still be very high. As a result, the item can also be automatically classified. On the other hand, if only CR13A and B1234 were found in the search, these would be assigned much lower confidence scores. The item would probably not automatically be classified. The thresholds of confidence for automatic classification can be set according to the needs of the particular implementation.

If the item is not classified, a second search view is taken, for example, a supplier and supplier part number attribute can be selected 118. As before, the reference list is searched for matching values 119 and the closest matches are selected 121. A confidence score is assigned to each selected match using a strategy similar to that described above. If the item now has a high enough confidence that it can be automatically classified 125, then it will be classified 117. As discussed above with respect to FIGS. 4 and 5, the confidence rating for the first search view and the second search view can be combined to determine a cumulative confidence score. This cumulative score can be applied to increase the confidence level if the same classification is suggested by two searches. A direct match of supplier and supplier part number attribute values also shows that the item has already been classified. Close matches for both manufacturer part No. and supplier part No. together suggest the item is similar to those of the close matches.

If the item cannot automatically be classified then a third search view can be selected 127. For example, a short description can be selected. In one example this description may read, "hybrid gel roller, rollerball, pen, fine, black". The reference list is searched for equivalent values 129 and the closest matches are selected 131. In one embodiment, each of the descriptive terms in the short description are searched independently each corresponding to a set of different categories. In one example, "black" may have 9,594 hits and relates to categories such as bookcases, business machine ribbons, binding combs and clamps, audio visual carts, shoe and boot covers, batteries, general lubricants, compressed air treatment units, ballpoint pens, chemical adhesives and air fresheners. The term "gel" may return 154 matches with categories of dispensers, glues and hand lotions. The descriptive term "rollerball" may return only one hit or matching descriptive term that corresponds to ballpoint pens. Looking only at the ballpoint pens category, the results may be presented as shown in Table 4. Black occurs as an attribute value in 99.4% of the pens in the classification knowledge database, gel in 5.4% and rollerball in 42.5%. Based on black and rollerball, high confidence can be placed on ballpoint pens as the proper category.

TABLE 4

| Category | Word | # Items | # Items in Category |
|---|---|---|---|
| Ballpoint Pens | Black | 994 | 1000 |
| Ballpoint Pens | Gel | 54 | 1000 |
| Ballpoint Pens | Rollerball | 425 | 1000 |

Viewed another way, the search on the short description returns a number of categories, however, in the present example there is only one category which is common to the three descriptive terms black, gel and rollerball. This category is ballpoint pens. As a result, a high level of confidence can be scored for the ballpoint pen category. Using the approaches discussed above, a confidence score is assigned to each selected match and the confidence scores are combined 133 for an overall score. If the item can be automatically categorized 135 then it will be 117. Otherwise, another attribute is selected 137.

The next selected attribute can be any of the other attributes that are associated with the item to be classified. The reference list is searched for this and any subsequent attributes 139. The closest matches are returned 141 and confidence scores are assigned to the results of the search 143. The confidence scores can be compiled for each match 145. With adjustments to the confidence scores for each type of search 147, the combined confidence scores can be adjusted for each category 149, and these results can be used to establish a ranking for each category with an associated confidence score 151. From this, it can be determined whether or not the item can automatically be classified 153 and, if so, it will be 117.

An example of combining confidence scores to develop an overall confidence ranking for all obtained categories can be seen in the tables that follow.

TABLE 5

| Search Method | Input Attributes | Ref. Attributes | Search Method(s) | Weight | Order | Pass Action |
|---|---|---|---|---|---|---|
| 1 | Mfgr, Mfg Part # | Mfg Name, Mfg Part Num | Proximity | 100 | 1 | Stop |
| 2 | Desc, Category | Desc. 3 (Highest Cleanse) | Proximity | 100 | 2 | Stop |
| 3 | Desc, Category | Desc. 2 | Proximity | 90 | 3 | Continue |
| 4 | Desc, Category | Desc. 3 (Highest cleanse) | Proximity w/spell check | 80 | 4 | Continue |
| 5 | Desc, Category | Desc. 3 (Highest cleanse | Word Count | 70 | 5 | Continue |
| 6 | Desc, Category | Desc. 1 (Lowest cleanse) | Word Count | 80 | 6 | Stop |
| 7 | Desc, Category | Desc. 1 (Lowest cleanse) | Proximity | 55 | 7 | Stop |
| 8 | Desc, Category | Desc. 1 (Lowest cleanse) | Proximity w/spell check | 40 | 8 | Continue |
| 9 | Desc, Category | Desc. 1 (Lowest cleanse) | Word Count | 30 | 9 | Stop |

Table 5 shows an example of weights and actions that can be used to create, for example, nine cascaded searches. Table 5 is provided as an example only. Many other types of searches can be used in many different orders. Each row is for a different search. Input attributes identifies the descriptive terms of the item to be classified. Reference attributes identifies the knowledge database terms that are searched. The type of search is identified in the search method column and can include proximity searches, proximity searches with a spell check, and word count searches. Weight indentifies the confidence score attached to the type of search. Order identifies the sequential ordering for conducting the searches and Pass Action identifies the course to take if a match is found. Accordingly, the first search is a proximity search for the manufacturer name and manufacturer part number. This type of search is given a weight of 100 so that if an exact match is found, the classification engine automatically classifies the item. The pass action is to stop, so no further searching is performed. The second search performed is a proximity search based on the description. This is performed only if the first search fails.

The searched description is a short description such as the description columns shown in Tables 1 and 2. Note that searches 2 through 9 are all performed on the description but the results from each search are given a different confidence score ranging from 30 to 100. This is accomplished using what is identified in Table 5 as low, medium and high cleanse.

Low medium and high cleanse refer to the words, symbols, tokens etc. of the classification knowledge database that are used in each search. In a low cleanse every word that relates to the description is searched. Accordingly, in search 7, if any word in the description of the item to be classified matches any word for descriptions in the classification knowledge database then the result is tabulated and scored with a weight of 55. If more than one word matches, then this is taken into account in determining the confidence score discussed above. The medium cleanse search works the same way except that in the classification knowledge database words that are less distinctive for a category are not searched. For the high cleanse search only the most characteristic words are searched.

So, for example, consider the pens of Table 2 as a partial listing of meta-item data in a knowledge classification database. All of the attribute values in Table 2 would likely be searched for in the lowest cleanse. For a medium cleanse, words such as ultra, blue, and red would be cleansed from the set of search terms. For a high cleanse, words such as flexgrip and retractable might be cleansed from the searchable terms. For the high cleanse, this leaves only the terms ballpoint, pen, tri-grip, Precise VS and rollerball. Any item that contains any one of these terms in its description can be classified as a pen with a fairly high degree of confidence.

As an alternative to the low, medium, high cleanse approach discussed above, the classification knowledge database can feature the more distinctive words more prominently. So, for the pens of Table 2, the database might have five occurrences of the distinctive word "ballpoint". The less distinctive word "retractable" might be repeated once, while the least distinctive word "red" may occur just once in the database for the pens category. In a search, a match for "ballpoint" results in five matches, for "retractable", two matches and for "red" one match. The results, if scored based on the number of matches, will then list hits that contain the most distinctive words as more relevant than those that contain only the least distinctive words.

The two examples above, low/medium/high cleanse and repeated words, are provided as examples that may be well suited in particular instances. In some kinds of classification systems or types of items, it may be best to simply treat all words the same. The search engine simply looks for matching words in a knowledge base and counts up the number of hits. This approach can be particularly powerful when the knowledge base is a reference catalog and when a cascaded search, as described above, is applied.

The benefit of a multi-level or cascading search with multiple search methodologies can be illustrated by an example. Assume the item to be classified discussed earlier, in this case a pen, with a description that reads "hybrid gel roller rollerball pen fine black" (see Table 1). A search according to method 2 of Table 5 might provide 3 matches each with a high confidence as shown in Table 6.

TABLE 6

| Category | Score (weighted & normalized) |
| --- | --- |
| Ballpoint Pens | 100 |
| General Lubricants | 100 |
| Glues | 100 |

As shown in Table 6, three categories came out with the highest ratings, ballpoint pens, general lubricants and glues. Since the score is 100, it is difficult for the system to automatically classify the item based on these results. Performing searches 3, 4, 5 and 6 of Table 5 can provide additional information. The results obtained by combining these 5 different searches is shown in Table 7.

TABLE 7

| Category | Score (weighted & normalized) |
| --- | --- |
| Ballpoint Pens | 94.7 |
| General Lubricants | 73.7 |
| Glues | 52.6 |
| Chemical Adhesives | 42.2 |
| Air Freshener | 21.1 |

The confidence scores can be determined heuristically, statistically, or with a variety of other approaches. In the case of Table 7, the confidence is sufficiently higher for pens (94.7) than for general lubricants (73.7) that the item can safely be classified as a pen. The parameters for determining when a score is high enough and how much higher a score must be than other scores will depend upon the particular application of the present invention. It will also depend on the balance between accurate classification and cost. It may be acceptable to have ten percent of the items misclassified in order to completely eliminate human intervention. Alternatively, the item of Table 7 could be classified in the top two categories. For the eventual electronic catalog, this would result in categories containing some percentage of misclassified items. On the other hand, it may help to ensure that each item is classified in a proper category.

If the confidence scores are not sufficiently high to automatically classify the result, the categories and confidence scores are presented to an operator or user 155 who then performs the human review and selection discussed before. The user designates a particular category as the best category for the item 157 and this is then used to classify the item.

Using multiple cascading searches on multiple attributes and many descriptive terms, it is unlikely that any items will not be able to be classified unless the items are unlike the items which already exist in any of the knowledge databases. However, in the event that items are not able to be automatically classified, the operator can be presented with a very short list of possible classifications. In many instances, by looking at the description of the item to be classified and the possible categories, the operator can very quickly select appropriate classification. In the provided example, it will normally be very simple for an operator to determine whether an item would fit in the five categories which were returned by the search engine as shown in Table 6. If no category is appropriate, then the user can add a new category for the new item.

FIG. 7

According to one embodiment of the invention, the search engine can search across multiple knowledge databases utilizing multiple search methodologies as illustrated in FIG. 7. The search engine receives a search string that includes one or more search terms 702. The search term may be a descriptive term of the item to be classified.

One or more databases containing can be searched for the search string according to an ordering of different search strategies 706, 710, 714. The search strategies each designate a database, a data set within the database, and a search methodology. Databases may reside in a physical location different from other databases. Each database may also have a structure and taxonomy different from other databases.

The data set designated within the database may be a field from a database table. The data set could also be a subset of data associated with a particular status, such as items "in-stock", or items that are supplied by a particular vendor. The same data set from the same database may be designated in more than one search strategy.

The searching may proceed in a designated order of search methodologies. The most restrictive, or narrowest search may be executed first. The designated search methodology is applied to the designated data set in the designated catalog to search for the received search string or terms similar to the search string. Search methodologies may include exact matching, soundex, fuzzy logic, stem searching, and word count searching. These methodologies are described in further detail with reference to FIG. 2.

If the current search methodology finds one or more matches, the searching may stop 726. The searching may also stop after all of the designated search methodologies have been executed. In alternate embodiments that may require a more exhaustive search, all of the search methodologies may be executed regardless of whether any of the previous search methodologies have found any matches. After the searching has stopped, the item may be automatically classified.

FIG. 8

Figure 8:
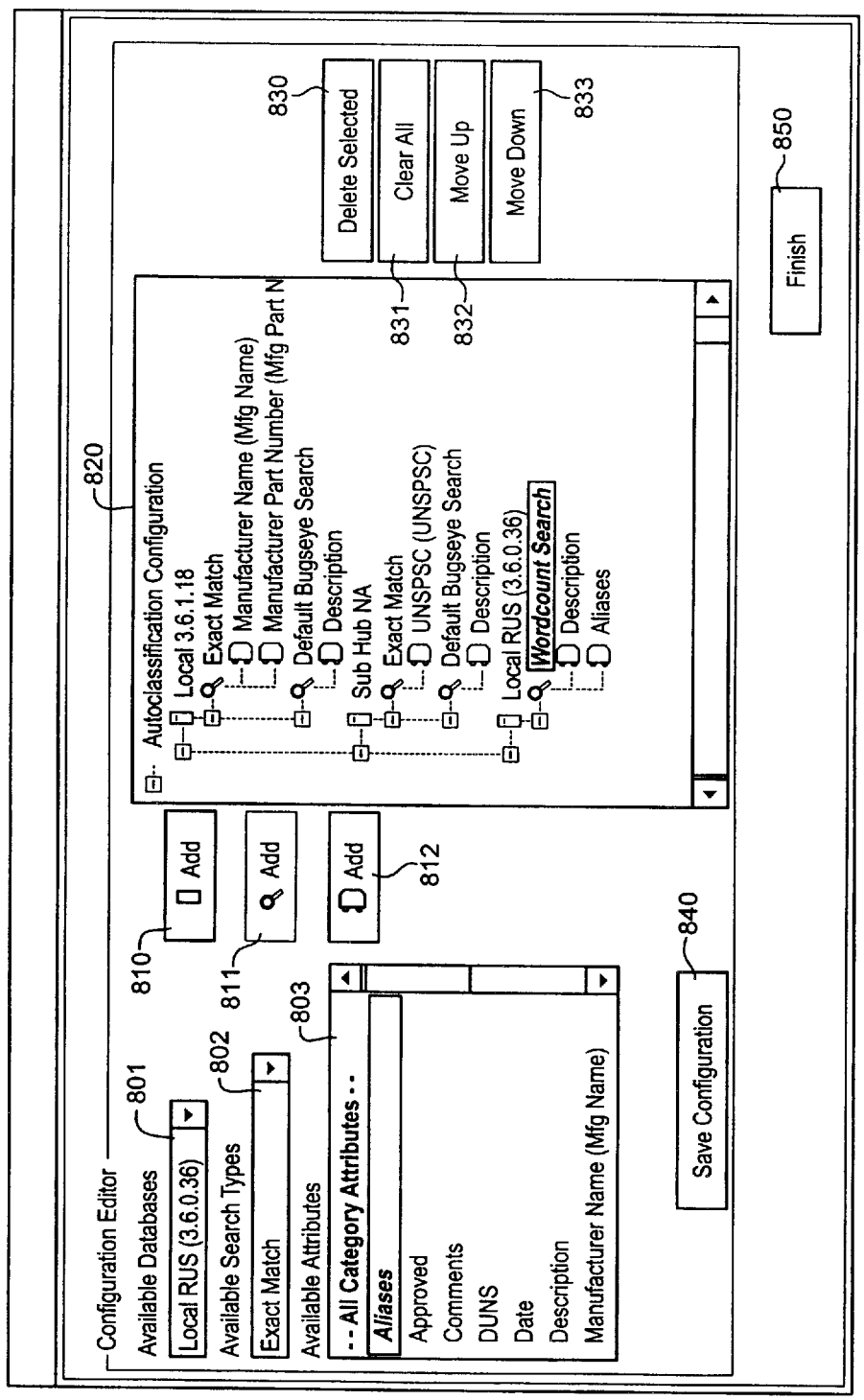
FIG. 8 is an exemplary graphical user interface for setting up an auto classification search configuration according to one embodiment of the invention.

A graphical user interface suitable for configuring searches for auto classification according to one embodiment of the invention will now be described with reference to FIG. 8. A first area of the user interface may be provided to allow the user to select a knowledge database in which a search methodology is to be performed 801. The embodiment shown in FIG. 8 presents the lists of databases as a drop-down list. In this illustration, the database selected is "Local RUS (3.6.0.36)". This selection appears in the display box portion of the drop-down list.

The user can view other available database choices by expanding the drop-down-list by clicking on the down arrow next to the display box or by pressing the down-arrow key on the keyboard. Alternately, the user may also be able to type a portion of the name of the desired database in the display box. The available databases may have been preconfigured or the user may be able to add available databases to the list by navigating to a different screen. Upon making or changing a selection, the newly selected database will appear in the display area of the drop-down list. In alternate embodiments, the databases may be presented as a list box, radio buttons, or any other format that would allow a user to designate a database. After the user has selected a database, the database may be added to a search configuration by selecting an "Add" button 810.

A second area of the user interface may allow the user to select a type of search to be performed in the catalog 802. The search types may also be presented to the user as a drop-down list, a list box, radio buttons, or any other format that would allow the user to designate a search type. FIG. 8 illustrates a drop-down list that functions similarly to that described above with reference to database selection. In FIG. 8, the currently selected search type is "Exact Match".

FIG. 9

Figure 9:
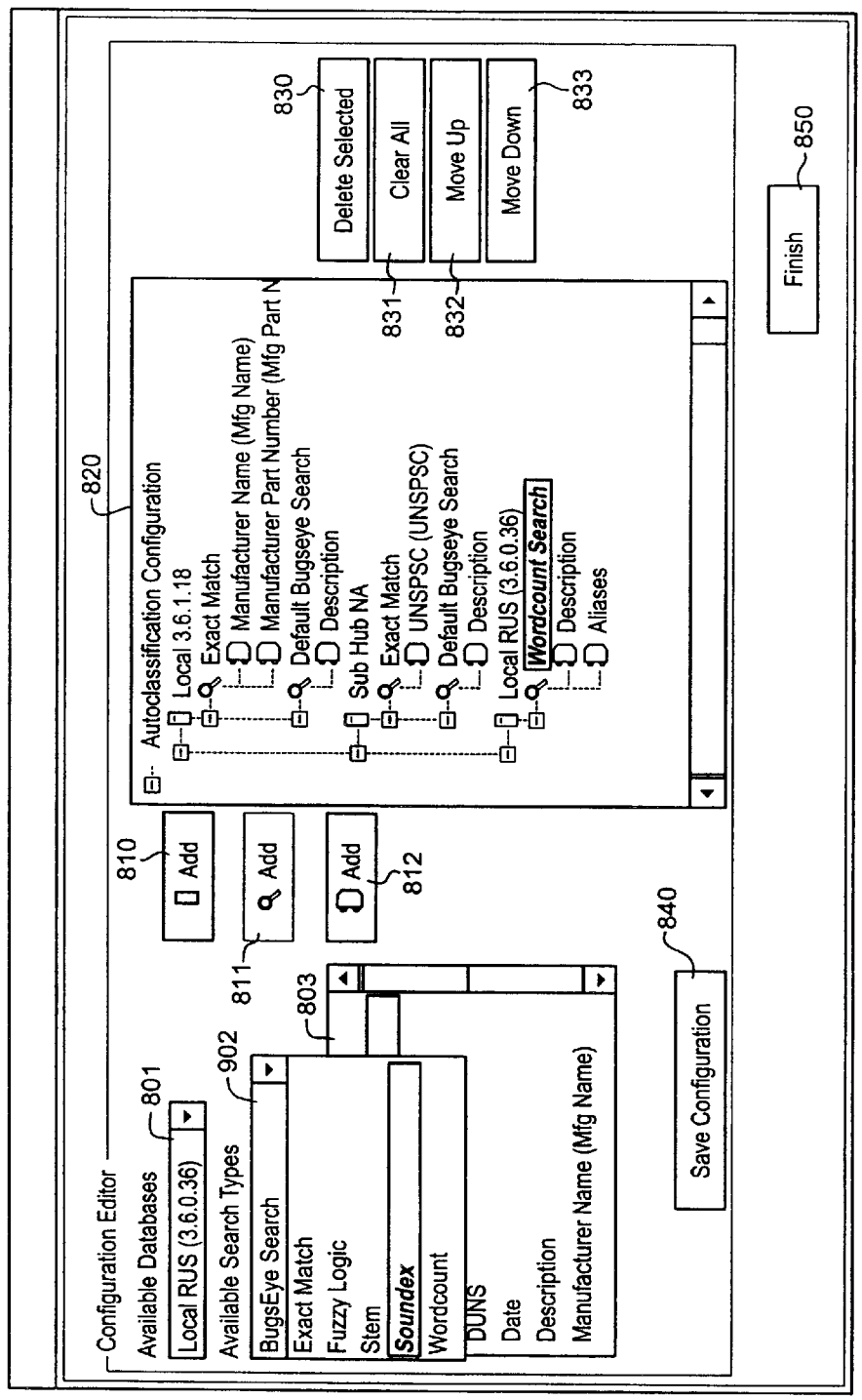
FIG. 9 is a more detailed view of the graphical user interface of FIG. 8.

FIG. 9 illustrates an expanded drop down list for the user to select a search type 902. The user may expand the drop down list by clicking on a down arrow, typing the down arrow on their keyboard, or some other method of expanding the list. After the list is expanded, the user can select from multiple search types. FIG. 9 illustrates a list of search types including: BugsEye™, Exact Match, Fuzzy Logic, Stem, Soundex, and Wordcount. The BugsEye™ search may perform a default cascade search using multiple search methodologies on the same data set. Other search methodologies may also be included. In FIG. 9, the user's current search type selection is "Soundex".

Returning to FIG. 8, after the user has selected a search type, the search type may be added to the search configuration by selecting an "Add" button 811. If the selected search type has already been added to the selected catalog, the "Add" button can be disabled until the user selects a different search type.

The user interface may also include a third area to allow the user to select a data set, or attribute, from the selected database in which the designated search type is to be executed 803. The user may also have the option of selecting all of the attributes within the catalog. The attributes may be presented as a drop-down list, a list box, radio buttons, or any other format that would allow the user to make an attribute selection. FIG. 8 illustrates a list box in which the user can select from the following attributes: "All Category Attributes", Aliases, Approved, Comments, DUNS, Date, Description, and Manufacturer Name (Mfg Name). The user could view more selections by scrolling down on the list box.

This area may be linked to the first area of the user interface. Before a user has selected an available database, this area may initially be blank or disabled. After the user has made a database selection, this area may become populated with the attributes of the selected database. Alternately, this area may be linked to a selection made in a fourth display area of the screen described below.

After the user has selected an attribute, the attribute may be added to the search configuration by selecting an "Add" button 811. If the selected attribute has already been added to the search configuration with the selected search type, the "Add" button 811 may become disabled until the user selects another attribute. In this embodiment, multiple "Add" buttons were described. In alternate embodiments, only one add button may be utilized to add an entire search methodology, including database, search type, and attribute, to the search configuration.

A fourth area of the screen may be used to display the autoclassification configuration 820. It may appear as a hierarchical tree with multiple levels for the database, search type, and attributes. Each level may be expanded or collapsed by selecting a "+" or "−" sign or some other similar methodology. If the third area of the screen is linked to the selection, the third area may become populated with attributes from the selected catalog.

The order displayed in this fourth area of the screen may represent the hierarchical order in which to perform the search methodologies. A button 832 may be provided to move a selection to a higher position in the search hierarchy. Another button 833 may be provided to move a selection to a lower position in the search hierarchy. Alternate mechanisms, such as "drag and drop" may also be used to move search methodologies to a different position in the search hierarchy.

The autoclassification configuration illustrated in FIG. 8 searches the "Local 3.6.1.18" database for an exact match of the Manufacturer Name attribute. If no matches are found, the next search performed in this database is an exact match on the Manufacturer Part Number. Following this search, the next search performed is a Default BugsEye™ search for the description. After the "Local 3.6.1.18" database, the next database searched is the "Sub Hub NA". In this database the first search performed is for an exact match on the UNSPSC attribute. The second search is a Default BugsEye™ search for the description. The last database configured in this search is the "Local RUS (3.6.0.36) database in which a Wordcount Search is performed first for the description and then for the aliases.

The user interface may also provide a mechanism for the user to delete selected search methodologies 830 or to clear the entire search configuration 831. These mechanisms may be buttons, menu selections, or some other type of mechanism. The user may also be able to delete selections made in the search configuration by typing the "delete" key on the keyboard. A final mechanism that will allow the user to save the current configuration may also be provided 840. This mechanism may also be a button, a menu selection, or an alternate mechanism that will allow the user to save the configuration.

After the search has been configured to the user's satisfaction, the use may finish setting up the configuration by selecting a "Finish" button 850. At this point, the items may be automatically classified as described in other parts of this application.

FIG. 10

Figure 10:
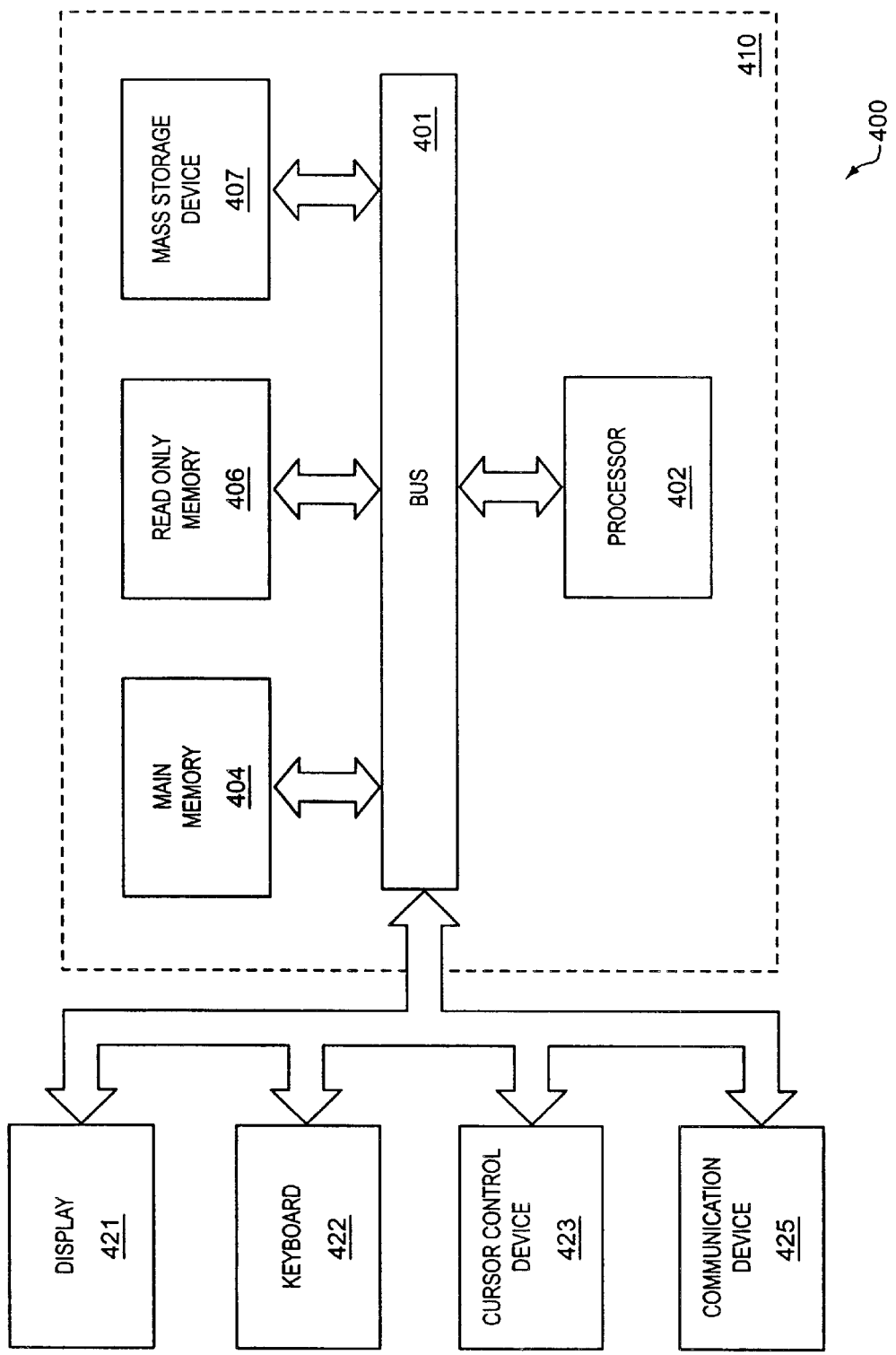
FIG. 10 is an example of a typical computer system suitable for implementing an embodiment of the present invention.

A computer system 400 representing an example of a system upon which features of the present invention may be implemented is shown in FIG. 10. The search engine and databases of FIG. 1 will typically be configured similar to what is shown in FIG. 10. The computer system can be deployed on a single platform as shown in FIG. 10 or different components can be provided on separate platforms so that the bus 401 connects several different platforms together containing different portions or aspects of the mass storage 407 and other system 410 components. The computer system can also be implemented in one or more small portable platforms such as laptops and PDAs. The computer system 400 includes a bus or other communication means 401 for communicating information, and a processing means such as a microprocessor 402 coupled with the bus 401 for processing information. The computer system 400 further includes a main memory 404, such as a random access memory (RAM) or other dynamic data storage device, coupled to the bus 401 for storing information and instructions to be executed by the processor 402. The main memory also may be used for storing temporary variables or other intermediate information during execution of instructions by the processor.

The computer system may also include a nonvolatile memory 406, such as a read only memory (ROM) or other static data storage device coupled to the bus for storing static information and instructions for the processor. A mass memory 407 such as a magnetic disk or optical disc and its corresponding drive may also be coupled to the bus of the computer system for storing information and instructions such as the various databases.

The computer system can also be coupled via the bus to a display device or monitor 421, such as a cathode ray tube (CRT) or Liquid Crystal Display (LCD), for displaying information to a user. For example, graphical and textual indications of installation status, operations status and other information may be presented to the user on the display device. Typically, an alphanumeric input device 422, such as a keyboard with alphanumeric, function and other keys, may be coupled to the bus for communicating information and command selections to the processor. A cursor control input device 423, such as a mouse, a trackball, or cursor direction keys can be coupled to the bus for communicating direction information and command selections to the processor and to control cursor movement on the display 421.

A communication device 425 is also coupled to the bus 401. The communication device 425 may include a modem, a network interface card, or other well known interface devices, such as those used for coupling to Ethernet, token ring, or;other types of physical attachment for purposes of providing a communication link to support a local or wide area network (LAN or WAN), for example. In this manner, the computer system may also be coupled to a number of clients or servers via a conventional network infrastructure, including an intranet or the Internet, for example. Source Content and the databases can be made available to the computer system in this way.

It is to be appreciated that a lesser or more equipped computer system than the example described above may be preferred for certain implementations. Therefore, the configuration of the exemplary computer system 400 will vary from implementation to implementation depending upon numerous factors, such as price constraints, performance requirements, technological improvements, or other circumstances.

It should be noted that, while the steps described herein may be performed under the control of a programmed processor, such as the processor 402, in alternative embodiments, the steps may be fully or partially implemented by any programmable or hard coded logic, such as Field Programmable Gate Arrays (FPGAs), TTL logic, or Application Specific Integrated Circuits (ASICs), for example. Additionally, the method of the present invention may be performed by any combination of programmed general purpose computer components or custom hardware components. Therefore, nothing disclosed herein should be construed as limiting the present invention to a particular embodiment wherein the recited steps are performed by a specific combination of hardware components.

In the present description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. The specific detail may be supplied by one of average skill in the art as appropriate for any particular implementation.

The present invention includes various steps, which may be performed by hardware components or may be embodied in machine-executable instructions, such as software or firmware instructions. The machine-executable instructions may be used to cause a general-purpose or special-purpose processor programmed with the instructions to perform the steps. Alternatively, the steps may be performed by a combination of hardware and software.

The present invention may be provided as a computer program product that may include a machine-readable medium having stored instructions thereon, which may be used to program a computer (or other machine) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or any other type of medium suitable for storing electronic instructions. Moreover, the present invention may also be downloaded as a computer program product, wherein the program may be transferred from a remote computer to a requesting computer by way of data signals embodied in a carrier wave or other machine-readable propagation medium via a communication link (e.g., a modem or network connection).

Importantly, while embodiments of the present invention are described with reference to categorizing office supplies, the method and apparatus described herein are equally applicable to categorizing any other types of an electronic catalog and other types of items including documents, and data files. In addition, while the invention has been described in terms of an electronic catalog, other types of ordered information stored in an electronic form can benefit from the present invention.

Although this disclosure describes illustrative embodiments of the invention in detail, it is to be understood that the invention is not limited to the precise embodiments described. The specification and drawings are, accordingly, to be regarded in an illustrative rather than a restrictive sense. Various adaptations, modifications and alterations may be practiced within the scope of the invention defined by the appended claims.

What is claimed is:

1. A method for classifying an item, the item having a plurality of attributes, each attribute having a value, the method comprising:
   selecting a first attribute of the item;
   designating a fist search strategy comprising the value of the first attribute applied to operate upon data records in a first database;
   selecting a second attribute of the item;
   designating a second search strategy comprising the value of the second attribute applied to operate upon a second subset of data records in a second database;
   forming a search hierarchy comprised of the first search strategy followed by the second search strategy;
   executing the search hierarchy;
   selecting at least one classification for the item based on the search.

2. The method of claim 1, wherein the first database and the second database comprise the same database.

3. The method of claim 1, wherein the first attribute and the second attribute comprise the same attribute.

4. The method of claim 1, wherein the first search strategy comprises the value of the first attribute applied to a first search methodology to operate upon a first subset of data records in the first database and the second search strategy comprises the value of the second attribute applied to a second search methodology to operate upon a second subset of data records in the second database.

5. The method of claim 4, wherein data records in the first subset are identified as being in the first subset by a certain value in the field of the data records.

6. The method of claim 4, further comprising designating a third search strategy comprising the value of the first attribute applied to operate upon a third subset of data records in the second database.

7. The method of claim 1, wherein the first search strategy comprises at least one of a fuzzy logic search, an exact match, a soundex search, a stem search, and a word count search.

8. The method of claim 1, wherein the first and second search strategies each comprise different search methodologies.

9. The method of claim 1, wherein the first database comprises an engineered knowledge base of classifications, each classification associated with at least one attribute and each attribute associated with at least one attribute value.

10. The method of claim 9, wherein the engineered knowledge base contains a plurality of item classifications mapped to a second classification schema.

11. The method of claim 1, wherein the first attribute is a part number of the item.

12. The method of claim 1, wherein the first attribute is a description of the item.

13. The method of claim 1, further comprising analyzing the first attribute value of the item against a stop list and excluding any stop list words from the comparison.

14. The method of claim 1, further comprising presenting the selected classifications to a user, receiving a designation from the user of at least one selected classification; and classifying the item in the designated classifications.

15. The method of claim 1, further comprising determining a confidence score for each selected classification for the item.

16. The method of claim 14, further comprising comparing confidence scores for all selected classifications and classifying the item in at least one of the selected classifications based on the confidence score comparison.

17. The method of claim 14, further comprising automatically classifying the item if the confidence score is above a threshold.

18. The method of claim 1, wherein executing the search hierarchy comprises completing execution of the first search strategy before beginning execution of the second search strategy.

19. The method of claim 18, further comprising skipping execution of the second search strategy upon finding at least one match using the first search strategy.

20. The method of claim 18, further comprising terminating execution of the fist search strategy before beginning execution of the second search strategy upon finding at least one match.

21. A machine-readable medium having stored thereon data representing sequences of instructions which, when executed by a machine, cause the machine to perform operations comprising:

selecting a first attribute of an item to be classified, the item having a plurality of attributes, each attribute having a value;

designating a first search strategy comprising the value of the first attribute applied to operate upon data records in a first database;

selecting a second attribute of the item to be classified;

designating a second search strategy comprising the value of the second attribute applied to operate upon a second subset of data records in a second database;

forming a search hierarchy comprised of the first search strategy followed by the second search strategy;

executing the search hierarchy;

selecting at least one item classification for the item based on the executing the search.

22. The medium of claim 21, wherein the first database and the second database comprise the same database.

23. The medium of claim 21, wherein the first attribute and the second attribute comprise the same attribute.

24. The medium of claim 21, wherein the first search strategy comprises the value of the first attribute applied to a first search methodology to operate upon a first subset of data records in the first database and the second search strategy comprises the value of the second attribute applied to a second search methodology to operate upon a second subset of data records in the second database.

25. The medium of claim 21, wherein the first search strategy comprises at least one of a fuzzy logic search, an exact match, a soundex search, a stem search, and a word count search.

26. The medium of claim 21, wherein the first and second search strategies each comprise different search methodologies.

27. The medium of claim 21, wherein the first database comprises an engineered knowledge base of classifications, each classification associated with at least one attribute and each attribute associated with at least one attribute value.

28. The medium of claim 21, further comprising instructions which, when executed by the machine, cause the machine to perform further operations comprising determining a confidence score for each selected item classification for the item.

29. The medium of claim 28, further comprising instructions which, when executed by the machine, cause the machine to perform further operations comprising comparing confidence scores for all selected classifications and classifying the item in at least one of the selected classifications based on the confidence score comparison.

30. The medium of claim 28, further comprising instructions which, when executed by the machine, cause the machine to perform further operations comprising automatically classifying the item if the confidence score is above a threshold.

31. An apparatus for classifying an item, the item having a plurality of attributes, each attribute having a value, the apparatus comprising:

a first classification knowledge database containing a plurality of values, each associated with at least one category;

a search engine to select a first attribute and a second attribute of the item, to execute a search hierarchy including a first search strategy comprising the value of the first attribute applied to operate upon a first subset of data records in the first classification knowledge database, the search hierarchy further including a second search strategy comprising the value of the second attribute applied to operate upon a second subset of data records in the first classification knowledge database, the search engine to select at least one classification for the item based on the search.

32. The apparatus of claim 31, further comprising a second classification knowledge database.

33. The apparatus of claim 31, wherein the search hierarchy further comprises a third search strategy comprising the value of the first attribute applied to operate upon a subset of data records in the second classification knowledge database.

34. The apparatus of claim 31, wherein the first search strategy comprises at least one of a fuzzy logic search, an exact match, a soundex search, a stem search, and a word count search.

35. The apparatus of claim 31, wherein the search engine is further to determine a confidence score for each selected classification for the item.

* * * * *